US007012885B1

(12) United States Patent
Lee

(10) Patent No.: US 7,012,885 B1
(45) Date of Patent: Mar. 14, 2006

(54) DATA COMMUNICATIONS APPARATUS FOR CABLE NETWORK

(76) Inventor: David S. H. Lee, 7-1212 Shindonga Apt. 1334 Seocho-dong, Seocho-gu Seoul (KR) 137-070

( * ) Notice: Subject to any disclaimer, the term of this patent is extended or adjusted under 35 U.S.C. 154(b) by 0 days.

(21) Appl. No.: 11/110,364

(22) Filed: Apr. 19, 2005

(51) Int. Cl.
*H04J 11/00* (2006.01)
*H04J 3/16* (2006.01)

(52) U.S. Cl. .................. 370/208; 370/465; 725/114; 375/141

(58) Field of Classification Search ............... None
See application file for complete search history.

(56) References Cited

U.S. PATENT DOCUMENTS

| | | | | |
|---|---|---|---|---|
| 5,815,794 A * | 9/1998 | Williams | ............... | 725/125 |
| 6,091,932 A * | 7/2000 | Langlais | ............... | 725/111 |
| 6,108,349 A * | 8/2000 | Melsa et al. | ............ | 370/465 |
| 6,912,194 B1* | 6/2005 | Marchok et al. | ......... | 370/208 |
| 2003/0002495 A1* | 1/2003 | Shahar et al. | ........... | 370/389 |

* cited by examiner

*Primary Examiner*—Duc Ho
(74) *Attorney, Agent, or Firm*—Lahive & Cockfield, LLP

(57) ABSTRACT

A data communications apparatus which uses the same frequency band and modulation scheme with those used in the counterpart apparatus, and has a simple configuration and shows high reliability in transmitting and receiving high-rate data through a cable network. The main processing unit receives the first data from the data processing device to perform orthogonal frequency division multiplexing (OFDM) on the first data to generate first OFDM signal, and demultiplexes second OFDM signal from the counterpart apparatus to recover the second data and provide to the data processing device. The RF unit transforms the first OFDM signal into a radio frequency band to generate the first modulated signal and transmit to the counterpart apparatus through the second port and the cable network. Also, the RF unit receives the second modulated signal from the counterpart apparatus to recover a second OFDM signal and provide to the main processing unit. The medium access control performing means detects collision in the cable network and selectively activates the main processing unit so that the RF unit transmits and receives signal to and from the counterpart apparatus through a common cable line.

14 Claims, 8 Drawing Sheets

DATA COMMUNICATIONS APPARATUS FOR CABLE NETWORK

BACKGROUND OF THE INVENTION

1. Field of the Invention

The present invention relates to a data communications apparatus and, more particularly, a data communications apparatus capable of performing bidirectional data communications through a cable network. This application for a communications apparatus is based on Korean patent application No. 2004-70119, which is incorporated by reference herein for all purposes.

2. Description of the Related Arts

The most common methods for implementing high-speed Internet subscriber network include the use of a DSL modem or a cable modem, which transmits and receives digital data through an existing twisted wire pair or a cable TV network, respectively. While the DSL modem is cost-effective in case that cable TV lines are broadly installed to a large majority of residences, the cable modem may be more effective alternative if cable TV lines are available in most of the residences. In a data communications network based on the cable TV network, each subscriber premise is connected to or equipped with a cable modem, which communicates with a counterpart, i.e., a headend to help the subscriber premise with Internet access.

FIG. 1 illustrates an example of a data communications system based on the cable TV network. In the system shown in FIG. 1, a headend or a cable modem termination system (CMTS) 10 is connected to a plurality of cable modems 34A, 34B through a tap 20 and/or a splitter 30. The CMTS 10 is connected to an Internet service provider (ISP) server 12, and the cable modems 34A, 34B are connected to client PCS 36A, 36B, respectively. The CMTS 10 modulates data to be transmitted from the ISP server 12 to a client PC 34A or 34B to transmit through the cable network, so that a desired cable modem 34A, for example, demodulates such data to provide to the client PC 34A. Similarly, the cable modem 34A modulates data generated by the client PC 34A to transmit to the CMTS 10, so that the CMTS 10 demodulates such data to provide to the ISP server 12.

Generally, a cable network equipment is manufactured to be compliant with Data Over Cable Service Interface Specification (DOCSIS) proposed by Multimedia Cable Network System (MCNS) and IEEE802.14 standard proposed by Institute of Electronic and Electrical Engineering (IEEE). According to the DOCSIS standard, the CMTS modulates the downstream data by 64 Quadrature Amplitude Modulation (QAM) or 256 QAM scheme in a frequency band of 5 MHZ to 45 MHZ to provide a data rate of 20 Mbps to 30 Mbps. The cable modem modulates the upstream data by Quadrature Phase Shift Keying (QPSK) or 16 QAM scheme in a frequency band of 65 MHZ to 750 MHZ to provide a data rate of 200 Kbps to 10 Mbps. Meanwhile, regarding medium access control (MAC), frequency domain multiple access (FDMA)/time division multiplexing (TDM) is used to facilitate communication from the CMTS to each cable modem and FDMA/time domain multiple access (TDMA) is used to facilitate communication from each cable modem to the CMTS.

However, the conventional CMTS and cable modem adopting FDMA or TDMA along with TDM are disadvantageous in that it is difficult for them to provide high data rates, for example, above 50 Mbps. Besides, the conventional CMTS and cable modem has drawbacks that they are much complex in their hardware configuration and show less reliability because different frequency bands and modulation schemes are used for the transmission of upstream and downstream data.

SUMMARY OF THE INVENTION

To solve the above problem, one object of the present invention is to provide a data communications apparatus which uses the same frequency band and modulation scheme with those used in the counterpart apparatus, and has a simple configuration and shows high reliability in transmitting and receiving high-rate data through a cable network.

The data communications apparatus for achieving the above object is connected to a data processing device through a first port and connected to a counterpart apparatus through a second port and cable network. The apparatus receives first data from the data processing device and modulates the first data to transmit first modulated signal to the counterpart apparatus, and receives second modulated signal from the counterpart apparatus and demodulate the second modulated signal to recover second data and provide to the data processing device.

The data communications apparatus includes a main processing unit, a RF unit, and medium access control performing means. The main processing unit receives the first data from the data processing device to perform orthogonal frequency division multiplexing (OFDM) on the first data to generate first OFDM signal, and demultiplexes second OFDM signal from the counterpart apparatus to recover the second data and provide to the data processing device. The RF unit transforms the first OFDM signal into a radio frequency band to generate the first modulated signal and transmit to the counterpart apparatus through the second port and the cable network. Also, the RF unit receives the second modulated signal from the counterpart apparatus to recover a second OFDM signal and provide to the main processing unit. The medium access control performing means detects collision in the cable network and selectively activates the main processing unit so that the RF unit transmits and receives signal to and from the counterpart apparatus through a common cable line.

Preferably, the medium access control performing means includes a MAC unit electrically connected to the first port and including a buffer for buffering the first data provided to the main processing unit; and a half-duplex controller for determining availability of the cable network and controlling the MAC unit. It is preferable that the main processing unit includes a quadrature amplitude modulator/demodulator and an OFDM unit. The quadrature amplitude modulator/demodulator performs quadrature amplitude modulation on the first data from the MAC unit to generate first QAM signal and demodulating second QAM signal to recover the second data. The OFDM unit performs OFDM on the first QAM signal to generate the first OFDM signal, and demultiplexes second OFDM signal to recover the second QAM signal. The main processing unit preferably further includes an error-correction encoder and an error-correction decoder. The error-correction encoder error-correction encodes the first data from the MAC unit to provide first error-correction encoded data to the quadrature amplitude modulator/demodulator. The error-correction decoder receives second error-correction encoded data from the first data from the quadrature amplitude modulator/demodulator to recover the second data and provide to the MAC unit.

Preferably, the half-duplex controller controls the MAC unit by a Distribution Coordination Function of CSMA/CA mode and centrally-controlled Point Coordination Function.

Also, the MAC unit communicates with the data processing device in data frame compliant with IEEE 802.11 standard.

The RF unit may include a modulating and detecting unit and a RF transformer. The modulating and detecting unit modulates the first OFDM signal to the first modulated signal and detects the second OFDM signal from the second modulated signal. The RF transformer amplifies and filters the first modulated signal to transmit to the counterpart apparatus, and filters and amplifies signal received through the second port and the cable network to provide the second modulated signal to the modulating and detecting unit.

It is preferable, but not limited to, that the apparatus operates in frequency band below 2.5 GHZ. More preferably, the apparatus operates in frequency band below 1 GHz.

By employing the OFDM scheme having been used typically in wireless communications system along with half-duplex communication mode (for example, IEEE802.11 compliant medium access control mechanism), the inventor have found that the communications system of the present invention accomplish data rate higher than 50 MHz. Also, the apparatus of the present invention enhances the efficiency of frequency bandwidth because data transmission is performed in the same frequency as that used in the reception. Further, the simple architecture of the apparatus can reduce the system purchasing or deploying cost.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
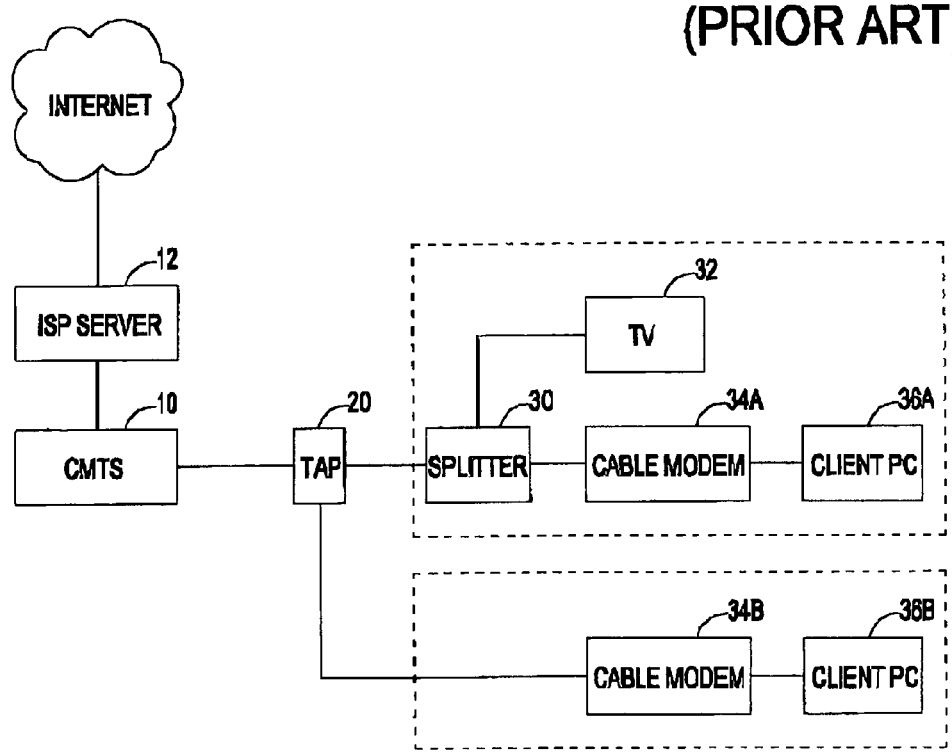
FIG. 1 illustrates an example of a data communications network based on a cable TV network.
Figure 2:
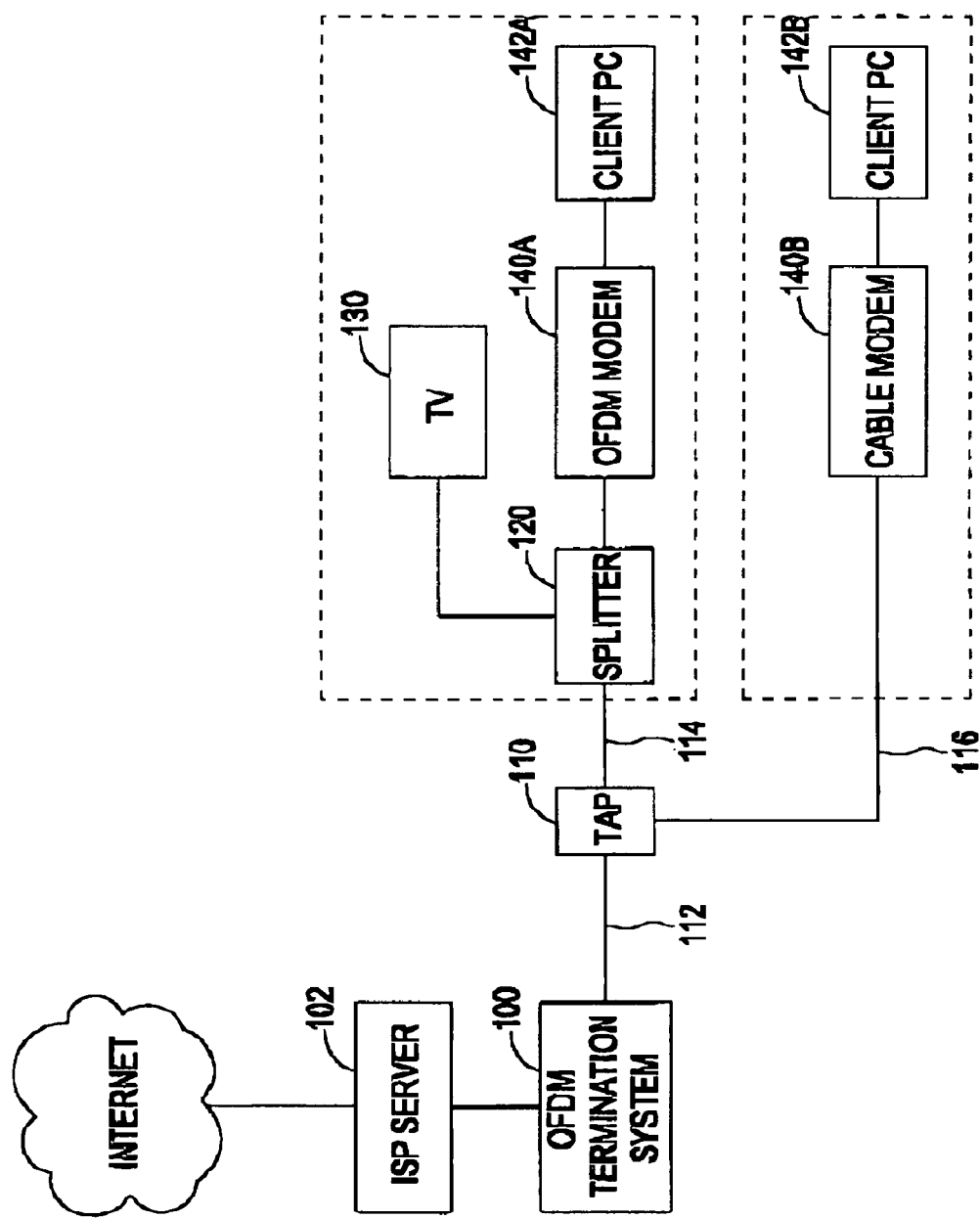
FIG. 2 illustrates an embodiment of a data communications network of the present invention.

Referring to FIG. 2, a data communications system of the present invention may be implemented based on a cable network. The data communications system includes an OFDM termination system 100 and OFDM modems 140A, 140B each for respective subscriber and connected to the OFDM termination system 100 through a cable network. The OFDM termination system 100 functionally corresponds to the conventional CMTS 10 shown in FIG. 1, and OFDM modems 140A, 140B correspond to the cable modems 34A, 34B, respectively.

The OFDM termination system 100 is connected to the OFDM modems 140A, 140B by coaxial cable lines 112, 114, 116 of the cable network through a tap 110 and/or a splitter 120. The coaxial cable network represented by the coaxial cable lines 112, 114, 116 may partially be implemented by a hybrid fiber coax (HFC) network. The OFDM termination system 100 is connected to an Internet service provider (ISP) server 12 through optical cable or unshielded twisted pair (UTP) cable, and the OFDM modems 140A, 140B are connected to client PCS 142A, 142B, respectively, through UTP cable or USB cable. The tap 110 divides and combines signals to and from several residences so as to accommodate a large number of subscribers, and the splitter 120 enables a television receiver and the client PC to share a single cable TV line.

In a preferred embodiment, the OFDM termination system 100 modulates data to be transmitted from the ISP server 102 to one of the client PCS 34A, 34B by QAM and OFDM schemes to transmit through the cable network, so that a desired OFDM modem 140A, for example, demodulates such data to provide to the client PC 142A. Similarly, the OFDM modem 140A modulates data generated by the client PC 142A by QAM and OFDM schemes to transmit to the OFDM termination system 100 through the cable network, so that the OFDM termination system 100 demodulates such data to provide to the ISP server 102. Thus, the system of FIG. 2 has a point-to-multipoint topology and facilitates the bidirectional communications between the ISP server 10 and the client PCS 142A, 142B.

Figure 3:
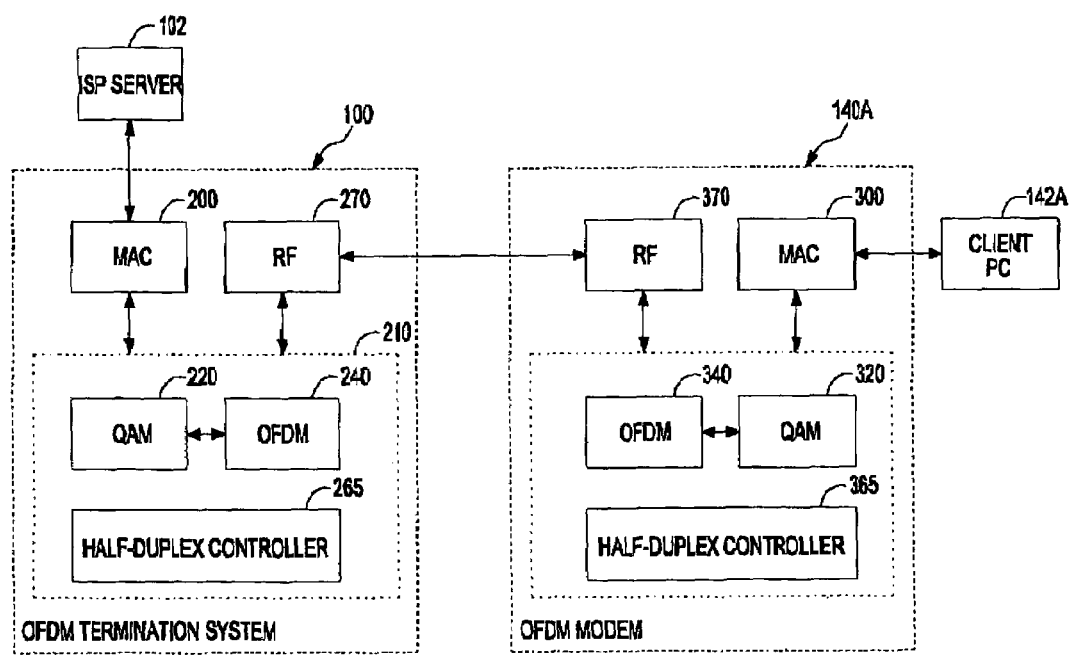
FIG. 3 is a schematic diagram showing a preferred embodiment of the OFDM termination system and one of the OFDM modems shown in FIG. 3.

FIG. 3 is a schematic diagram of an embodiment of the OFDM termination system 100 and the OFDM modem 140A.

The OFDM termination system 100 includes a MAC 200, a main processing unit 210, and a RF unit 270. The MAC 200 decapsulates Ethernet packets received from the ISP server 102 and encapsulates data to be transmitted to the ISP server 102 into Ethernet packets. Also, the MAC 200 includes a first in first out (FIFO) buffer, and temporarily stores data to be modulated by the main processing unit 210, so that the modulation process of the main processing unit 210 is mediated while avoiding data collision in the coaxial line. The main processing unit 210 receives, from the MAC 210, data to be transmitted to the OFDM modem 140A to modulate by QAM and OFDM schemes, demodulates signal received from the OFDM modem 140A, and supports half-duplex communication by detecting and avoiding data collision in the coaxial line based on the received signal. The RF unit 270 upconverts the frequency band of the modulated signal into the RF band to transmit to the OFDM modem 140A, and downconverts the frequency band of signal received from the OFDM modem 140A to provide to the main processing unit 210.

The main processing unit 210 includes a QAM unit 220, an OFDM unit 240, and a half-duplex controller 265. The QAM unit 220 performs QAM process for the data received from the MAC 200, and the OFDM unit spreads the spectrum of the QAM signal by performing inverse Fast Fourier Transform (IFFT) with respect to the signal. The half-duplex controller 265 determines the busy status of the transmission medium, i.e., the coaxial line based on the signal received through the RF unit 270, and controls the input and output of the MAC 200 depending on the determination result. In case that the medium is not being used, data is allowed to transfer from the MAC 200 to the main processing unit 220. the medium is being used, however, the data transfer from the MAC 200 to the main processing unit 220 is inhibited. By repetitively controlling the operation of the MAC 200, the half-duplex controller 265 enables the half-duplex communications.

Similarly, the OFDM modem 140A includes a MAC 300, a main processing unit 310, and a RF unit 380. The MAC 300 decapsulates Ethernet packets received from the client PC 142A and encapsulates data to be transmitted to the client PC 142A into Ethernet packets. Also, the MAC 300 includes a first in first out (FIFO) buffer, and temporarily stores data to be modulated by the main processing unit 310, so that the modulation process of the main processing unit 310 is mediated while avoiding data collision in the coaxial line. The main processing unit 310 receives, from the MAC 310, data to be transmitted to the OFDM termination system 100 to modulate by QAM and OFDM schemes, demodulates signal received from the OFDM termination system 100, and supports half-duplex communication by detecting and avoiding data collision in the coaxial line based on the received signal. The RF unit 380 upconverts the frequency band of the modulated signal into the RF band to transmit to the OFDM termination system 100, and downconverts the frequency band of signal received from the OFDM termination system 100 to provide to the main processing unit 310. Since the configuration and operation of the main processing unit 310 are similar to those of unit 210, detailed description thereof is omitted.

Figure 4:
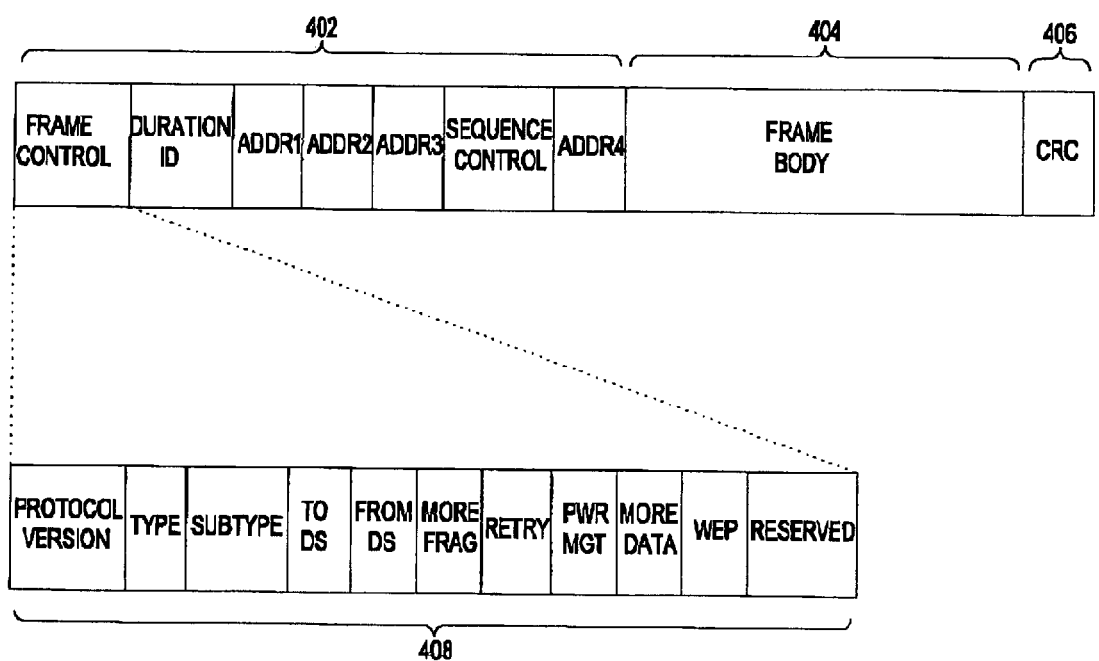
FIG. 4 shows the frame format specified in IEEE 802.11 standard.

Preferably, the OFDM termination system 100 and the OFDM modem 140A of the present invention use frame format specified in IEEE 802.11. FIG. 4 shows the frame format of IEEE 802.11, which format is applied to all the frames transmitted between the OFDM termination system 100 and the OFDM modem 140A regardless of the type of frames. The frame shown in the drawing is comprised of a frame header 402, a frame body 404, and a frame check sequence (FCS) 406.

IEEE 802.3 compliant Ethernet packets transferred from the OFDM termination system 100 or the OFDM modem 140A are mapped into the variable-length frame body 404 as payloads. The frame body 404 is preceded by the frame header 402, which consists of following components: FRAME CONTROL field, DURATION/ID field indicating back off time which depends on the transferred frame, ADDRESS1 to ADDRESS4 fields depending on the type of the transferred frame, and SEQUENCE CONTROL field. The FRAME CONTROL field consists of PROTOCOL VERSION field, DATA TYPE field, SUBTYPE field, TO DS field, FROM DS field, MORE FRAG field, RETRY field, POWER MANAGEMENT field, MORE DATA field, WEB field, and ORDER field. Meanwhile, a 32-bit wide frame check sequence is calculated based on cyclic redundancy code (CRC) and appended behind the frame body 404 as the frame check sequence (FCS) 406.

In addition to the frame format of IEEE 802.11, the OFDM termination system 100 and the OFDM modem 140A preferably use the medium access control (MAC) mechanisms specified in IEEE 802.11: (1) the basic access mechanism referred to as the Distributed Coordination Function (DCF) based on Carrier-Sense Multiple Access with Collision Avoidance (CSMA/CA), and (2) a centrally-controlled access mechanism referred to as the Point Coordination Function (PCF) based on polling.

In DCF mechanism, a station, i.e., the OFDM termination system 100 or the OFDM modem, willing to transmit data packet first transmits a short control packet in a contention period before sending the data packet in order to determine whether another station is transmitting data over the desired channel. The station receives the signal in the channel just after sending the control packet and determines whether a collision has occurred in the channel by finding a signal other than that sent by itself. In case that the medium is free for a specified time, then the station is allowed to transmit the data packet. If a collision occurred, however, the station defers the transmission of the data packet and retries the transmission after a random backoff time.

In PCF mechanism which is an optional mode for allowing the transmission of time-bounded and contention-free frames, the OFDM termination system 100 plays the role of a point coordinator. At the beginning of a contention-free period, the OFDM termination system 100 has a chance of obtaining coordination authority. In this operation mode, medium access of all the OFDM modems connected to the cable network is controlled by the OFDM termination system 100.

Figure 5:
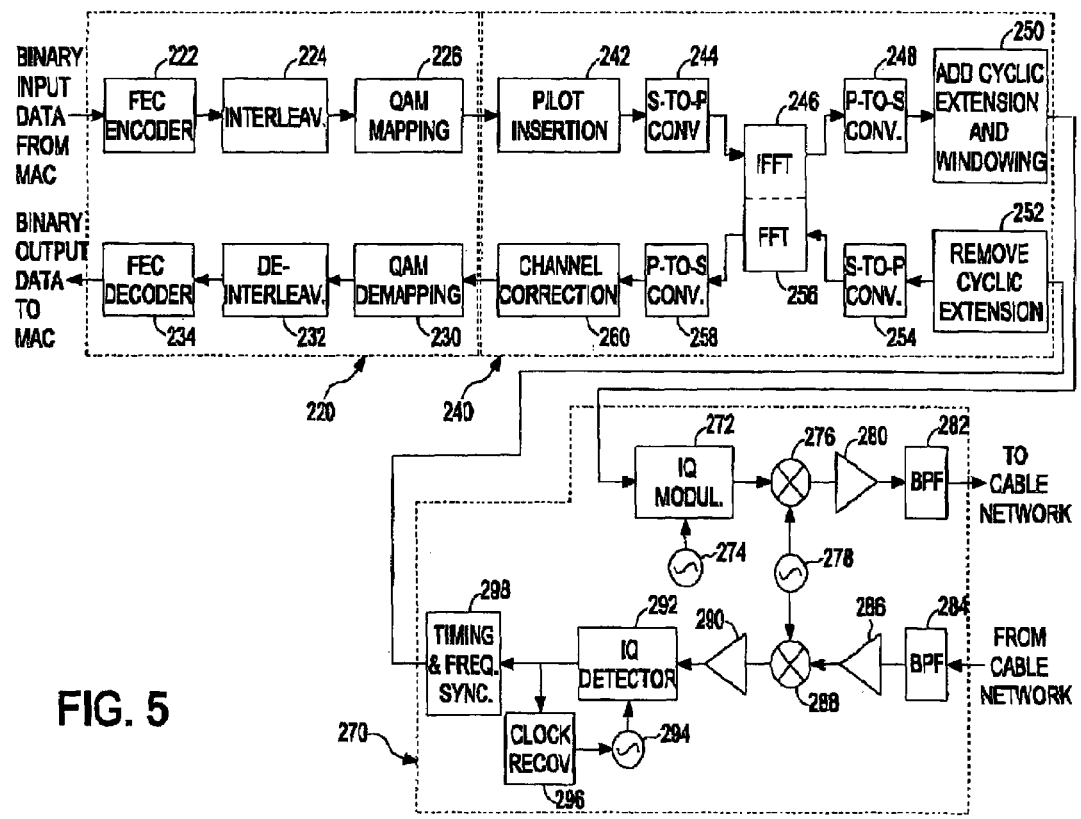
FIG. 5 is a detailed block diagram of the QAM unit, the OFDM unit, and the RF unit of the OFDM termination system shown in FIG. 3.

FIG. 5 illustrates, in detail, the QAM unit 220, the OFDM unit 240, and the RF unit 270 of the OFDM termination system 100 shown in FIG. 3.

The QAM unit 220 includes a forward-error-correction (FEC) encoder 222, an interleaver 224, a QAM mapping unit 226, a QAM demapping unit 228, a deinterleaver 232, and a FEC decoder 234. The FEC encoder 222 error-correction-codes transmit data to enhance the error robustness, and the interleaver 224 interleaves the error-correction-coded data so as to change an burst error which may be introduced in the channel into random errors. The QAM mapping unit 226 performs 16 QAM operation, for example, on the interleaved data to generate 16 QAM I and Q signals and provide to the OFDM unit 240. The QAM demapping unit 228, the deinterleaver 232, and the FEC decoder 234 perform inverse processes of the processes performed by the counterparts equipped with the OFDM modem 140A similarly to the FEC encoder 222, the interleaver 224, and the QAM mapping unit 226, thereby restoring the data sent by the client PC 142A.

In the OFDM unit 240, a pilot insertion unit 242 inserts pilot symbols into the QAM symbol sequence from the QAM unit 320. A serial-to-parallel converter 242 converts the symbol sequence inserted with the pilot symbols into parallel format. An IFFT block 246 performs IFFT operation on parallel symbol sequences to spreads the frequency band and form OFDM symbols. A parallel-to-serial converter 248 converts the parallel OFDM symbols back to serial format. A cyclic extension adder 250 adds a cyclic prefix to the OFDM symbols. Meanwhile, a cyclic extent remover 252 removes, from the received signal, the cyclic prefix added by the OFDM modem 104A. A serial-to-parallel converter 254 converts prefix removed data into parallel format. A FFT block 256 performs FFT operation on parallel data from the serial-to-parallel converter 254 to despread the received OFDM symbols. A parallel-to-serial converter 258 converts the despreaded data back to serial format. A channel correction unit 260 removes pilot symbols from the despreaded QAM symbol sequence.

In the RF unit 270, IQ modulator 272 modulates the carrier of 40 MHZ from an oscillator 274 to 16 states with the OFDM IQ symbols. A upconverter 276 upconverts the frequency band of the modulated signal using the signal of 22 MHZ from an oscillator 278. A high power amplifier (HPA) 280 amplifies the upconverted signal, and a bandpass filter (BPF) 282 filters the amplified signal by selectively passing desired frequency bands to transmit through the cable network.

A BPF 284, having the same pass band as the BPF 282 bandpass-filters the signal received through the cable network. A low noise amplifier 286 amplifies the filtered signal, and a downconverter 288 downverts the frequency band of the amplified signal using the signal of 22 MHZ from the oscillator 278. An automatic gain control (AGC) amplifier 290 amplifies the downconverted signal depending on the intensity of the downconverted signal. An IQ detector 292 demodulates the amplified signal using the signal of 40 MHZ from an oscillator 294 to recover the OFDM I and Q symbols. The output signal of the oscillator 274 is controlled by an clock recovery unit 296. A timing and frequency synchronizer 298 controls timing and frequency of the demodulated signal.

On the other hand, the QAM unit 320, the OFDM unit 340, and the RF unit 370 of the OFDM modem 140A have the same configuration as those of the OFDM termination system 100, and thus the OFDM termination system 100 and the OFDM modem 140A operates symmetrically.

Figure 6:
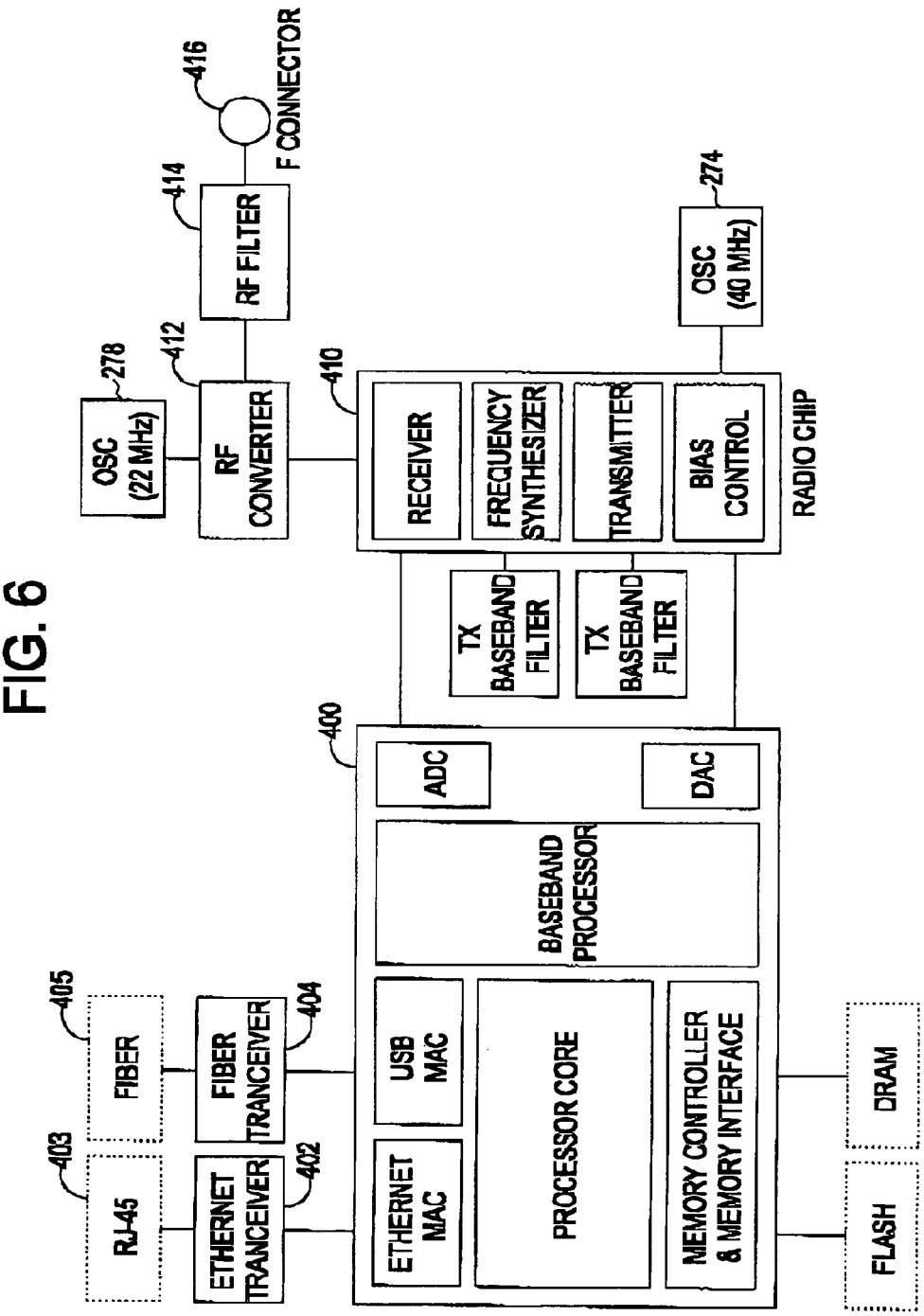
FIG. 6 illustrates an example of implementation of the OFDM termination system.

FIG. 6 illustrates an example of implementation of the OFDM termination system 100. The OFDM termination system 100 may be implemented using a microcontroller 300 having an embedded CPU, and a radio chip 410. The MAC unit 200 and the main processing unit is implemented by program executed by the microcontroller 400. In this example, the microcontroller 400 is connected to an Ethernet transceiver 402 and/or an optical transceiver 404. The Ethernet transceiver 402 and the optical transceiver 404 are connected to the ISP server 102 by twisted pair 403 and optical fiber 405, respectively. Also, the OFDM termination system 100 is connected to the cable network through a F-connector 416.

Figure 7:
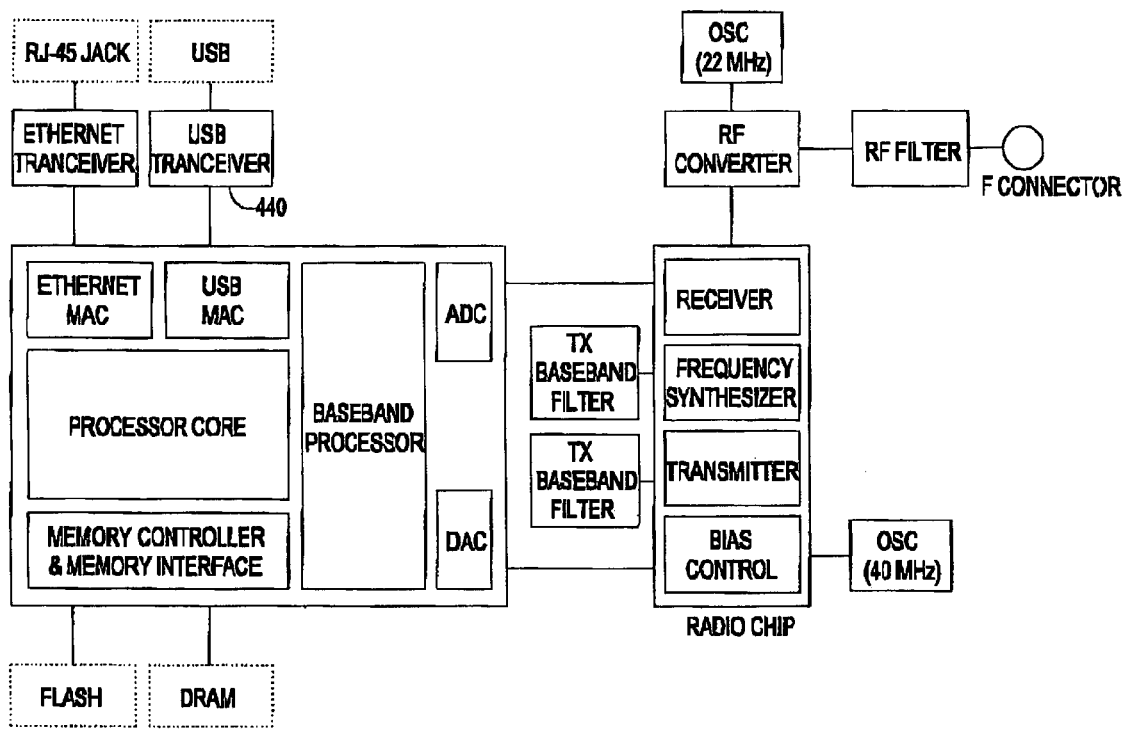
FIG. 7 illustrates an example of implementation of the OFDM modem.

FIG. 7 illustrates an example of implementation of the OFDM modem 140A. In this example, the OFDM modem 140 has the same configuration as that of the OFDM termination system 100 of FIG. 6 except that a USB transceiver 440 may be used instead of the optical transceiver.

The frequency band for the operation of the communication devices is limited typically by the characteristics of the transmission medium and the taps. The OFDM termination system 100 and the OFDM modem 140A may be used in the frequency band below 2.5 GHZ preferably in consideration of the signal transferring capability of the taps, and below 1 GHZ more preferably.

Figure 8A:
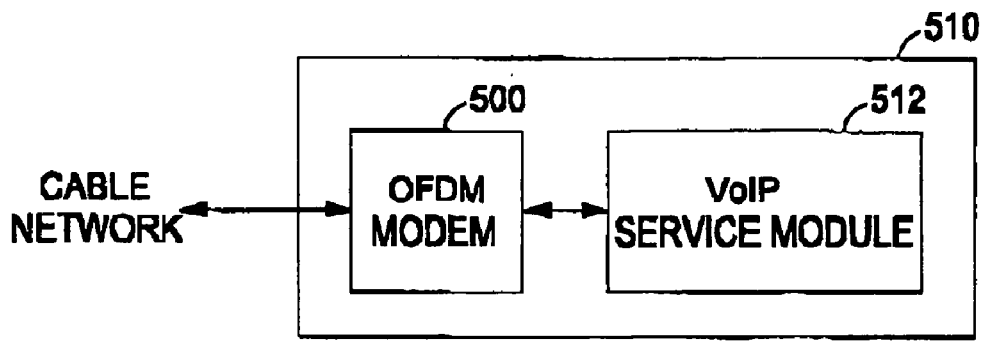
FIGS. 8A through 8C illustrates another embodiments of the data communications apparatus of the present invention.
Figure 8B:
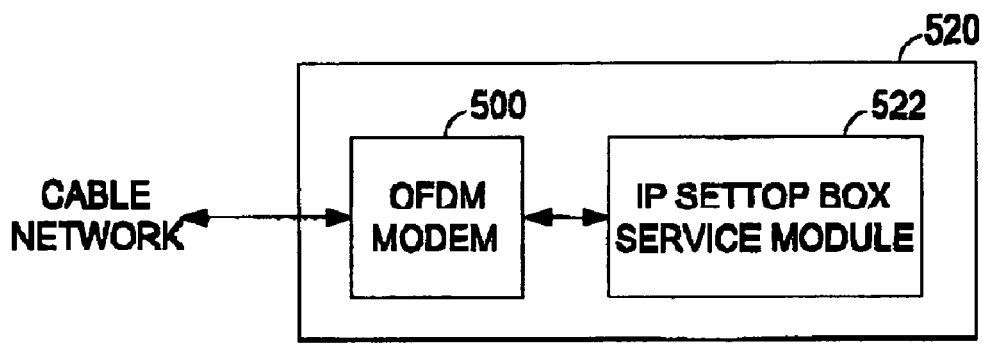
Figure 8C:
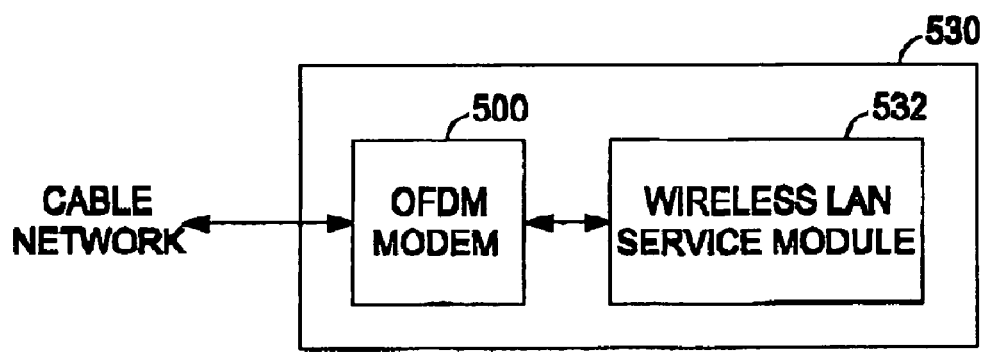

While the OFDM termination system or the OFDM modem can be manufactured and used in stand-alone type, such an apparatus can be employed in an application system which requires an network connection capability. FIGS. 8A through 8C shows such alternative embodiments of the present invention.

In FIG. 8A, the OFDM modem 500 is employed in a voice over Internet Protocol (VoIP) system 510 to enable the system 510 to access Internet through the cable network. With the assistance of the OFDM modem 500, a VoIP service module 512 which includes protocol stacks and user interfaces provides VoIP service to the user. The configuration of the OFDM modem 500 is similar to that shown in FIG. 3 except that the modem 500 may be directly coupled to the VoIP sercive module 512.

In FIG. 8B, the OFDM modem 500 is employed in a settop box system 520 for providing video on demand (VOD) service through the Internet. In the system of FIG. 8B, a settop box service module 522 which includes protocol stacks and user interfaces communicates an appropriate Internet server to provide VOD service to the user.

In FIG. 8C, the OFDM modem 500 is employed in a wireless LAN access point (AP) 530 for facilitating wireless terminals to access Internet. In the system of FIG. 8C, a wireless LAN service module 522 which includes RF circuits and protocol stacks communicates with the OFDM modem communicates in data frames compliant with IEEE 802.11 standard.

Although the present invention has been described in detail above, it should be understood that the foregoing description is illustrative and not restrictive. Those of ordinary skill in the art will appreciate that many obvious modifications can be made to the invention without departing from its spirit or essential characteristics. We claim all modifications and variation coming within the spirit and scope of the following claims.

What is claimed is:

1. A data communications apparatus, connected to a data processing device through a first port and connected to a counterpart apparatus through a second port and cable network, for receiving first data from the data processing device and modulate the first data to transmit first modulated signal to the counterpart apparatus and receiving second modulated signal from the counterpart apparatus and demodulate the second modulated signal to recover second data and provide to the data processing device, said data communications apparatus comprising:

a main processing unit for receiving the first data from the data processing device to perform orthogonal frequency division multiplexing (OFDM) on the first data to generate first OFDM signal, and demultiplexing second OFDM signal from the counterpart apparatus to recover the second data and provide to the data processing device;

a RF unit for transforming the first OFDM signal into a radio frequency band to generate the first modulated signal and transmit to the counterpart apparatus through said second port and the cable network, and receiving the second modulated signal from the counterpart apparatus to recover a second OFDM signal and provide to said main processing unit; and means for performing medium access control to detect collision in the cable network and selectively activate said main processing unit so that said RF unit transmits and receives signal to and from the counterpart apparatus through a common cable line.

2. The apparatus as claimed in claim 1, wherein said medium access control performing means comprises:

a MAC unit electrically connected to said first port and including a buffer for buffering the first data provided to said main processing unit; and a half-duplex controller for determining availability of the cable network and controlling said MAC unit.

3. The apparatus as claimed in claim 2, wherein said main processing unit comprises:

a quadrature amplitude modulator/demodulator for performing quadrature amplitude modulation on the first data from the MAC unit to generate first QAM signal and demodulating second QAM signal to recover the second data; and an OFDM unit for performing OFDM on the first QAM signal to generate the first OFDM signal, and demultiplexing second OFDM signal to recover the second QAM signal.

4. The apparatus as claimed in claim 3, wherein said main processing unit further comprises:

an error-correction encoder for error-correction encoding the first data from the MAC unit to provide first error-correction encoded data to said quadrature amplitude modulator/demodulator; and an error-correction decoder for receiving second error-correction encoded data from the first data from said quadrature amplitude modulator/demodulator to recover the second data and provide to said MAC unit.

5. The apparatus as claimed in claim 2, wherein said half-duplex controller controls the MAC unit by a Distribution Coordination Function of CSMA/CA mode and centrally-controlled Point Coordination Function.

6. The apparatus as claimed in claim 2, wherein said MAC unit communicates with the data processing device in data frame compliant with IEEE 802.11 standard.

7. The apparatus as claimed in claim 1, wherein said RF unit comprises:
   a modulating and detecting unit for modulating the first OFDM signal to the first modulated signal and detecting the second OFDM signal from the second modulated signal; and
   a RF transformer for amplifying and filtering the first modulated signal to transmit to the counterpart apparatus, and filtering and amplifying signal received through said second port and the cable network to provide the second modulated signal to said modulating and detecting unit.

8. The apparatus as claimed in claim 1, wherein said first port comprises an optical transceiver providing connection to the data processing device.

9. The apparatus as claimed in claim 1, wherein the cable network includes a plurality of taps operating in frequency band below 2.5 GHz.

10. The apparatus as claimed in claim 9, wherein the taps operates in frequency band below 1 Ghz.

11. A system for providing a predetermined service in a state of being connected to Internet, comprising:
    a networking unit for connecting to the Internet; and
    a service module coupled to the networking unit for transmitting and receiving data to and from the Internet through the networking unit to provide the service,
    wherein said networking unit is connected to an external counterpart unit through a network and cable network for receiving first data from the service module modulating the first data to transmit first modulated signal to the external counterpart unit, and receiving second modulated signal from the external counterpart unit and demodulating the second modulated signal to recover second data and provide to the service module,
    wherein said networking unit comprises:
      a main processing unit for receiving the first data from the service module to perform orthogonal frequency division multiplexing (OFDM) on the first data to generate first OFDM signal, and demultiplexing second OFDM signal from the external counterpart unit to recover the second data and provide to the service module;
      a RF unit for transforming the first OFDM signal into a radio frequency band to generate the first modulated signal and transmit to the external counterpart unit through said port and the cable network, and receiving the second modulated signal from the external counterpart unit to recover a second OFDM signal and provide to said main processing unit; and
      means for performing medium access control to detect collision in the cable network and selectively activate said main processing unit so that said RF unit transmits and receives signal to and from the external counterpart unit through a common cable line.

12. The system as claimed in claim 11, wherein said service module is a VoIP service module.

13. The system as claimed in claim 11, wherein said service module is a settop box service module.

14. The system as claimed in claim 11, wherein said service module is a wireless LAN service module.

* * * * *